United States Patent Office 2,831,344
Patented Apr. 22, 1958

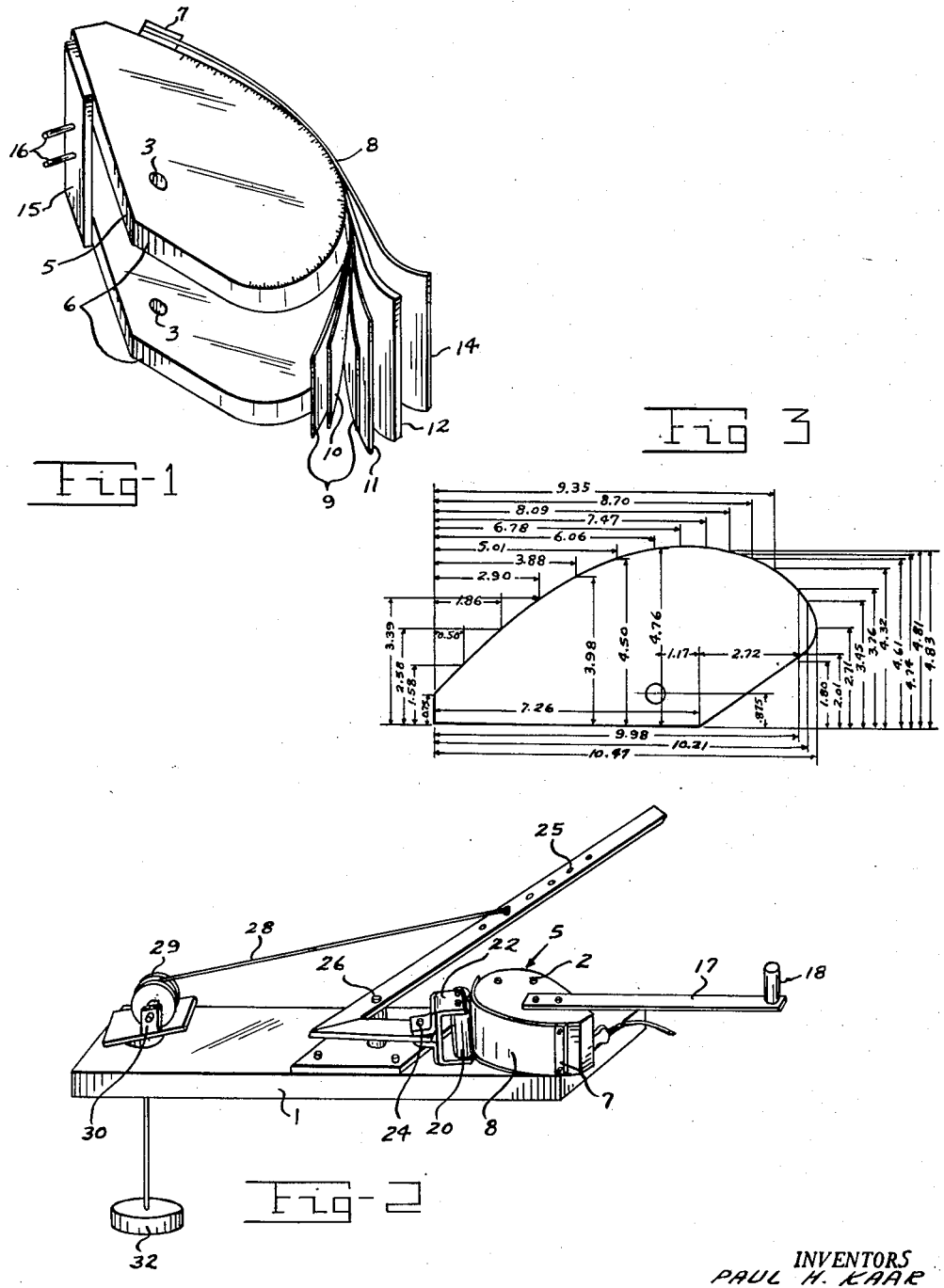

2,831,344

FORMING TEST APPARATUS FOR THERMO-SETTING PLASTIC

Paul H. Kaar, Wilmette, and Edmund Frank, Chicago, Ill., assignors to the United States of America as represented by the Secretary of the Air Force Application June 3, 1957, Serial No. 663,327

5 Claims. (Cl. 73—100)

This invention relates to an apparatus for performing bending tests of thermosetting plastics and other plastics which display very poor forming qualities. While this machine is designed primarily for bending tests on plastics, it may be suitable for performing these tests on materials other than plastics.

An object of this invention is to provide an apparatus which will establish the point of fracture of thermosetting plastics and other plastics which display very poor forming qualities, based on the radius of curvature of the material being tested when it is bent.

A further object is to provide an apparatus capable of showing the minimum radius to which thermosetting and other plastics can be formed.

A further object is to provide an apparatus affording a substantially constant load application to the material being tested.

A further object is to provide an uncomplicated and easily manufactured device capable of carrying out bending tests on thermosetting plastics.

The above objects, as well as other objects, features and advantages of the apparatus of this invention will be more clearly apparent in view of the following description and claims when taken in conjunction with the accompanying drawings wherein:

Figure 1 is a perspective view of the forming test apparatus for thermosetting plastics, as assembled;

Figure 2 is a perspective view of the work support; and

Figure 3 is a plan view of the plate layout for the supporting surface showing at various points the lateral and vertical dimensions relative to each other.

Referring now to Figure 2, the reference numeral 1 indicates an elongated metal base in the form of a channel member which is provided with a rigid vertical pivot pin 2 on which a work support generally indicated by the reference numeral 5 is rotatably mounted. The work support may be made of a block of metal or other rigid material but as seen in detail in Figure 1 comprises a pair of plate members 6 arranged in parallel spaced relation and secured together by suitable spacers and screws (not shown). The plates 6 are provided with aligned holes 3 for mounting of the assembly 5 on the pivot pin 2. The plates 6 are shaped on their upper edges in the form of a spiral curve with a constantly decreasing radius of curvature from the left to the right end. For example, the radius at the left end may be 12 inches and gradually decreasing to a minimum of 0.35 inch at the right end. A suitable indicating scale of radii of curvature may be engraved on the face of the upper one of the plates 6 along the spiral curve to serve as an indicating means.

As seen in Figures 1 and 2, a clamping plate 7 is provided, secured by screws to the plates 6 adjacent the point of maximum radius of curvature. As seen in Figure 1 the clamp 7 serves to retain the test assembly 8 to the work support. The assembly 8 comprises a pair of mica sheets 9 having a heater coil of electric resistance wire 10 interposed therebetween and adapted to engage a flexible steel sheet 11 which is adapted when bent to contact the spiral edges of the plates 6. The plastic sheet to be tested, indicated by reference numeral 12, rests on the metal sheet 11 and is covered by an outer flexible steel sheet 14 to which forming pressure is applied. An insulating bridge member 15 is mounted on the work support and serves to retain electric connector pins 16 which serve to conduct current to the heater coil. An electric thermocouple (not shown) may contact the underside of the metal sheet 11 to indicate the temperature of the plastic specimen and to serve to control the heater current by well known means, to maintain a constant temperature.

Referring again to Figure 2, the work support assembly 5 is provided with an arm 17 secured by screws to the upper side of the upper plate 6 and having a handle 18 so that the work support may be manually rotated about the pivot pin 2. A pair of rollers 20, with vertical axes, are provided for applying bending force to the test assembly 8. The rollers are pivoted in a U-shaped support 22 which is pivotally secured to the bifurcated end 24 of a lever 25 which is pivotally supported at 26 from the base 1. The lever 25 extends laterally from its pivotal axis 26 and is adapted to be adjustably connected to one end of a cable 28 which passes over a guide pulley 29 rotatably supported by a bracket 30 at the left end of the base 1 which is provided with a suitable aperture through which the cable 28 passes. A weight 32 is fixed on the lower end of the cable 28. The weight 32, through the cable 28 and the lever 25 supplies a constant force on the rollers 20.

It is apparent that in lieu of the lever mechanism, a constant force could be applied to rollers 20 by cylinder and piston, actuated by pneumatic or hydraulic fluid pressure.

In operation, the specimen to be tested is smoothed to remove any roughness and cracks and is preheated in an oven with an accurate temperature control to the optimum forming temperature recommended by the manufacturer. The metal sheets 11 and 14 are then heated to said optimum forming temperature by introducing an electrical current through the heating coil 10. This temperature is measured by placing a thermocouple between the sheets 11 and 14. The specimen 12 to be tested, which has been pre-cut to substantially the same width and length as the insertable space between the sheets 11 and 14, is then conformably inserted between said sheets 11 and 14 in such a manner that one end of said specimen 12 rests against the clamp 7. The rollers 20, which receive amplified force of known magnitude from the weight 32, are adjusted to a position against the sheet 14 at the clamp 7. The lever 25 is then rotated counter-clockwise, as far as possible, to insure that the rollers 20 are forcing the test assembly 8 against the spiral plates 6. When the specimen 12 is secure between the sheets 11 and 14, the arm 17 is rotated slowly in a counter-clockwise direction, forcing the said test assembly 8 against the spiral plates 6 by means of lever 25, until fracture of the specimen 12 occurs. The point of fracture is then read directly from the radii graduations along the edge of the top plate surface 6.

It is apparent that the work support 5 may be made of a block of solid metal and that the plastic sheet could be clamped to the metal block and the assembly heated in an oven to the desired forming temperature and then rapidly transferred to the test apparatus to complete the test. By employing such an arrangement it would be unnecessary to use the heater coil. Such an arrangement is clearly contemplated as being within the scope of the invention.

The above specification and drawing describe a specific embodiment of the invention for purposes of explanation, it being apparent that various minor changes may be

We claim:

1. A machine for performing bending tests on plastic materials comprising a base, a work supporting element mounted on said base and having an arcuate surface for supporting the specimen to be tested which surface is formed with a decreasing radius of curvature from one end to the other, clamping means on said work supporting element for clamping the specimen to be tested in contact at the end of said arcuate surface having the maximum radius of curvature, a roller element supported on said base and adapted to apply forming pressure to the specimen to be tested, means yieldingly urging said roller element toward the specimen to be tested with a constant predetermined pressure and means for rotating one of said elements relative to the other whereby the plastic specimen is bent with a continuously decreasing bend radius until fracture occurs.

2. A machine for performing bending tests on plastic materials comprising a base, a work support pivotally mounted on said base, said work support having an arcuate surface for supporting the specimen to be tested which surface is formed with a decreasing radius of curvature from one end to the other, clamping means on said work support for clamping the specimen to be tested in contact with the work support at the end of said arcuate surface having the maximum radius of curvature, means to rotate said work support about its pivotal axis, a roller supported on said base and adapted to apply forming pressure to the specimen to be tested, and means for yieldingly urging said roller toward the specimen to be tested with a constant predetermined pressure, rotation of said work support causing said roller to bend the specimen to be tested into contact with the arcuate surface of said work support.

3. Apparatus as claimed in claim 2, in which the roller for applying pressure to the specimen is mounted on a lever, said lever being pivotally mounted on the base and weight means connected to the lever for applying a loading force to the roller.

4. Apparatus as claimed in claim 2, in which an insulated flexible heating coil is mounted so as to be in heat exchange relation with the specimen to be tested.

5. Apparatus for testing brittle plastic materials by bending and determining the bend radius at fracture comprising an elongated work support having an arcuate surface formed with a decreasing radius of curvature from one end of the work support to the other end thereof, means for clamping the specimen to be tested in contact with the said arcuate surface at the end thereof having the maximum radius of curvature and means for forcing the plastic specimen into progressive contact with the work support until fracture occurs.

References Cited in the file of this patent

UNITED STATES PATENTS

| 2,528,918 | Stanius | Nov. 7, 1950 |
| 2,764,889 | Hughes | Oct. 2, 1956 |

FOREIGN PATENTS

| 501,983 | Germany | July 9, 1930 |